Oct. 19, 1948.     W. C. J. SMITH     2,451,882
LIQUID PROPORTIONING GAUGE OR INDICATOR
Filed Aug. 17, 1945
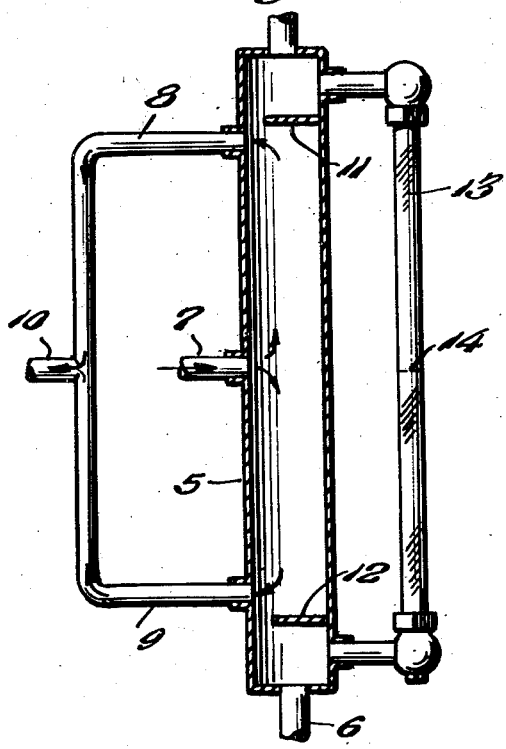
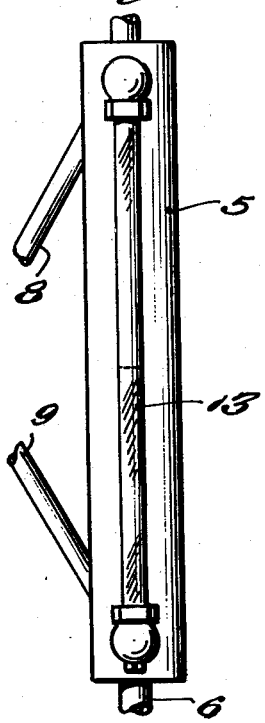
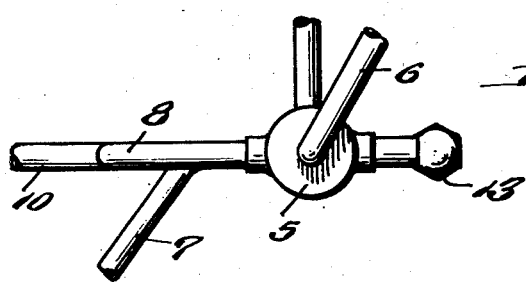
Inventor
Walter C. J. Smith
By Clarence A. O'Brien
and Harvey B. Jackson
Attorneys Patented Oct. 19, 1948

2,451,882

UNITED STATES PATENT OFFICE 2,451,882

LIQUID PROPORTIONING GAUGE OR INDICATOR

Walter C. J. Smith, Regina, Saskatchewan, Canada

Application August 17, 1945, Serial No. 611,159

1 Claim. (Cl. 73—53)

The present invention relates to new and useful improvements in liquid proportioning gauges or indicators adapted for use where two liquids of different specific gravity are mixed and a definite knowledge of the proportionate amount of each liquid is desired as the liquids flow through a pipe or other conduit.

As an example, one such process is the washing of gasoline in a refinery where a solution of caustic soda or other treating agent is violently mixed with newly distilled gasoline by action of a centrifugal pump, and the mixture discharged by the pump into a settling tank when the lighter liquid, the gasoline, is taken to a gasoline tank, and the heavier liquid, the treating solution, is drawn from the bottom of the tank and used over and over by the pump.

For best results in a process of this nature, a definite proportion of gasoline to treating agent is necessary. In ordinary practice, this proportion is obtained by adjusting valves at the intake side of the pump. Then, to check results, it is the usual practice for an attendant to draw off a sample in a bottle. When the mixed sample in the bottle has settled, a measurement is taken and a proportion is decided.

This method of determining the relative proportions of the liquid is cumbersome and expensive, since the sample is usually thrown away.

It is accordingly an object of the present invention to overcome the aforesaid objectionable practice and to provide a sight gauge or indicator connected in the pipe line adjacent the pump and by means of which the proportion of light and heavy liquid passing through the pipe may be readily determined.

A further object of the invention is to provide a device of this character of simple and practical construction, which is efficient and reliable in use, relatively inexpensive to manufacture, and otherwise well adapted for the purposes for which the same is intended.

Other objects and advantages reside in the details of construction and operation, as more fully hereinafter described and claimed, reference being had to the accompanying drawings forming part hereof, wherein like numerals refer to like parts throughout, and in which:

Figure 1 is a side elevational view of the proportioning gauge or indicator, and with liquid chamber shown in section.

Figure 2 is a front elevational view.

Figure 3 is a top plan view.

Referring now to the drawings in detail, the numeral 5 designates a cylindrical liquid chamber closed at each end and mounted in a vertical position by means of suitable supports 6.

A suitable pump (not shown), is connected to both the settling tank containing the treating reagent and the gasoline tank of untreated gasoline (also not shown), and a pipe 7 connects the discharge side of the pump to one side of the chamber 5 substantially at the center thereof, as indicated in Figure 1 of the drawings.

The flow of mixed liquid entering the chamber 5 divides, as indicated by the arrows, part of the liquid flowing up and part flowing down through the chamber 5. Upper and lower outlet pipes 8 and 9 are connected to the chamber 5 and are both connected to a pipe 10 which leads to the suction or intake side of the pump.

The flow of liquid is fairly rapid through the chamber 5 in order that no separation of the lighter and heavier liquids may take place therein.

Upper and lower baffles 11 and 12 are provided in the chamber 5 immediately above and below the pipes 8 and 9, respectively.

A sight gauge 13 of the water gauge type is connected at its upper and lower ends to the chamber 5 immediately above and below the baffles 11 and 12, respectively, the baffles preventing circulation or flow of the liquid through the gauge 13.

The dividing of the flow of liquid in the chamber 5 is for the same purposes as stated with respect to the baffles 11, 12, as all kinetic forces in the chamber are balanced by this method.

Thus, the two liquids, as visible in the sight gauge 13, must always weigh the same as the mixture in the chamber 5, and the line of demarcation, as indicated at 14, will move up or down in response to any change in proportion of the amounts of the liquid in the chamber 5.

In view of the foregoing description taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claim.

Having thus described the invention, what I claim is:

A gauge of the class described comprising a vertical tube, an inlet at an intermediate portion of the tube adapted to admit a mixture of relatively heavy and light liquids into the tube, outlets at the upper and lower portions of the tube to provide for a circulation of the liquid vertically in the tube downwardly and upwardly from the inlet, a sight gauge connected to the tube between the outlets and the ends of the tube to arrange the same out of the path of circulation of the liquid, and baffles in the tube between the outlets and the connections of the sight gauge to the tube to prevent circulation of the liquid through the gauge.

WALTER C. J. SMITH.

REFERENCES CITED

The following references are of record in the file of this patent:

UNITED STATES PATENTS

| Number | Name | Date |
|---|---|---|
| 1,705,669 | Kobernik | Mar. 19, 1929 |
| 1,426,955 | Carter | Aug. 22, 1922 |
| 1,440,832 | Jones | Jan. 2, 1923 |
| 1,856,662 | Showers et al. | May 3, 1932 |
| 2,180,811 | King | Nov. 21, 1939 |
| 2,231,781 | Swerdloff | Feb. 11, 1941 |
| 2,338,986 | Waterman | Jan. 11, 1944 |
| 2,371,457 | Mendius | Mar. 13, 1945 |